United States Patent
Takahashi et al.

(10) Patent No.: US 8,681,390 B2
(45) Date of Patent: Mar. 25, 2014

(54) OPTICAL SCANNER, IMAGE FORMING APPARATUS, AND BUFFER CONTROL METHOD FOR OPTICAL SCANNER

(75) Inventors: Motoyoshi Takahashi, Osaka (JP); Masayuki Hayashi, Osaka (JP); Hiroaki Ikeda, Osaka (JP); Kunihiro Komai, Osaka (JP); Yoshinori Shirasaki, Osaka (JP); Fuminori Tsuchiya, Osaka (JP); Akinori Yamaguchi, Osaka (JP); Tatsuya Miyadera, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 148 days.

(21) Appl. No.: 13/462,029

(22) Filed: May 2, 2012

(65) Prior Publication Data

US 2012/0287479 A1 Nov. 15, 2012

(30) Foreign Application Priority Data

May 12, 2011 (JP) .................................. 2011-106997

(51) Int. Cl.
*H04N 1/40* (2006.01)

(52) U.S. Cl.
USPC ........................... 358/444; 358/475; 358/404

(58) Field of Classification Search
None
See application file for complete search history.

(56) References Cited

U.S. PATENT DOCUMENTS

| | | | |
|---|---|---|---|
| 6,909,521 B1 * | 6/2005 | Murakami | .................. 358/1.2 |
| 7,663,654 B2 | 2/2010 | Arai et al. | |
| 2011/0181918 A1 * | 7/2011 | Motoyama | .................. 358/404 |

FOREIGN PATENT DOCUMENTS

| | | |
|---|---|---|
| JP | 06-227037 | 8/1994 |
| JP | 2007-144731 | 6/2007 |

* cited by examiner

*Primary Examiner* — Kimberly A Williams
(74) *Attorney, Agent, or Firm* — IPUSA, PLLC

(57) ABSTRACT

In an optical scanner, when an emission control unit varies a period at which image data is output from an output buffer of the emission control unit in order to correct a sub scan magnification of a LED array and a vacant region of an input buffer of the emission control unit ceases to exist, a buffer control unit temporarily stores the image data in a vacant region of a memory of an image correcting unit, and transfers the image data temporarily stored in the memory to the input buffer when the vacant region is generated in the input buffer.

12 Claims, 11 Drawing Sheets

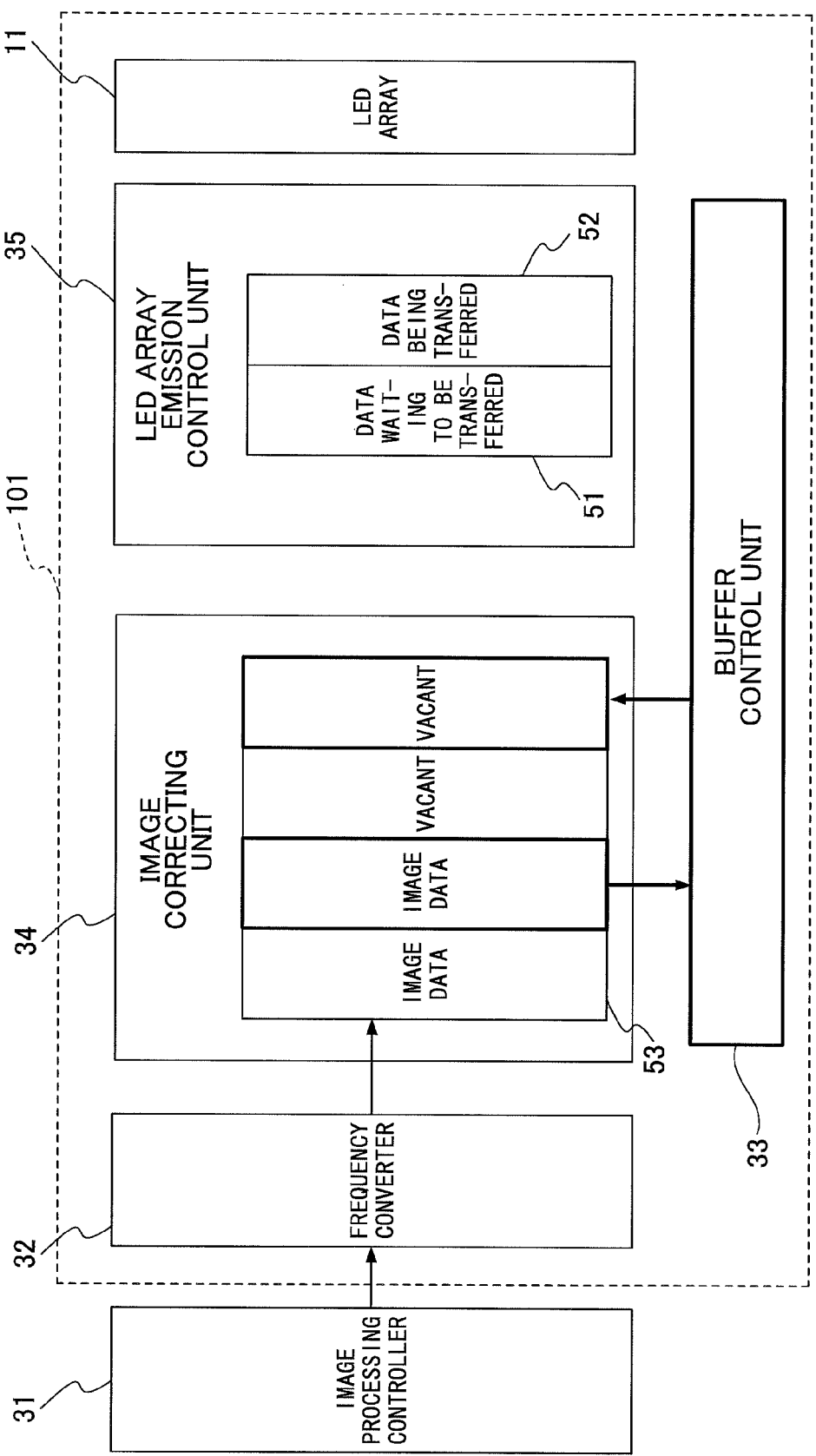

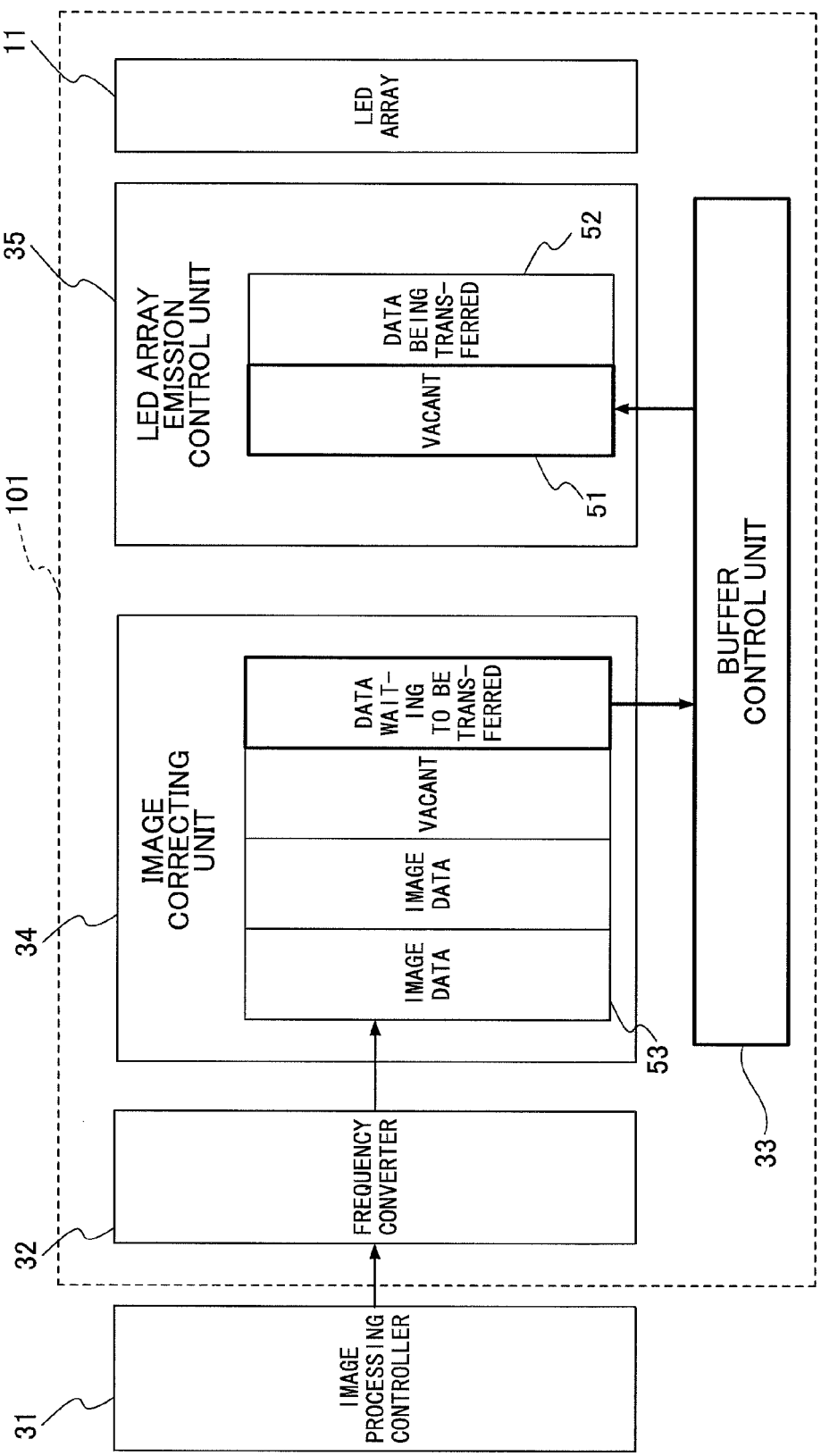

OPTICAL SCANNER, IMAGE FORMING APPARATUS, AND BUFFER CONTROL METHOD FOR OPTICAL SCANNER

CROSS-REFERENCE TO RELATED APPLICATIONS

This application is based upon and claims the benefit of priority of the prior Japanese Patent Application No. 2011-106997, filed on May 12, 2011, the entire contents of which are incorporated herein by reference.

BACKGROUND OF THE INVENTION

1. Field of the Invention

The present invention generally relates to optical scanners, image forming apparatuses, and buffer control methods for optical scanners, and more particularly to an optical scanner having a LED (Light Emitting Diode) array, and to a technique used in an image forming apparatus and a buffer control method in order to control storage and transfer of image data when correcting a sub scan magnification of the LED array.

2. Description of the Related Art

In the image forming apparatus employing the electrophotography technique, such as a printer and a copying apparatus, an electrostatic latent image is optically formed on a surface of an image bearing member, such as a photoconductive drum, by a laser beam or the like. An image is formed by adhering toner on the electrostatic latent image.

When an eccentricity is generated in the photoconductive drum of the image forming apparatus, a peripheral velocity of the surface of the photoconductive drum varies periodically. As a result, an error may be generated in the line interval or pitch in a paper transport direction (or sub scan direction) of the electrostatic latent image that is formed on the surface of the photoconductive drum. When the error in the line interval or pitch is generated, an image quality of the image that is finally formed on paper or the like may deteriorate due to an inconsistency in tone, a partial expansion or contraction of the image, and the like.

Methods have been proposed to prevent such a deterioration of the image quality, by detecting an amount of error in the line interval or pitch. For example, when optically forming the electrostatic latent image, an amount of light of the laser beam or the like emitted in the sub scan direction may be corrected depending on the detected amount of error in the line interval or pitch.

When a LED array in which a plurality of LEDs are arranged is used in order to optically form the electrostatic latent image, the cause of the image quality deterioration may be prevented by correcting a light emission period of the LED array.

One example of the method to prevent the image quality deterioration is proposed in a Japanese Laid-Open Patent Publication No. 2007-144731. According to this proposed method, an image forming apparatus includes an exposure unit, a moving unit, and a light emission control unit. The exposure unit includes a plurality of light emitting parts arranged along a first direction, and the moving unit moves the exposure unit and an image bearing member relative to each other in a second direction perpendicular to the first direction. The light emission control unit forms an image on the image bearing member by periodically emitting the light from the light emitting parts of the exposure unit, depending on image data representing the image to be formed on the image bearing member. In addition, the light emission control unit varies a light emission period of the light emitting parts during formation of the image, in order to correct a periodic variation in at least one of a tone and a magnification along the second direction within the image formed on the image bearing member.

According to the image forming apparatus employing this proposed method, the periodic variation in at least one of the tone and the magnification along the sub scan direction within the image may be corrected, because the light emission period of the light emitting parts is varied in order to correct the periodic variation in at least one of the tone and the magnification along the second direction perpendicular to the first direction within the image formed on the image bearing member.

The image data are temporarily stored in a buffer when emitting the light from the LED array. However, the buffer needs to have a large capacity when correcting the sub scan magnification by varying the light emission period of the LED array, because the amount of image data to be stored in the buffer becomes large.

On the other hand, in order to drive the LED array at a high speed, the buffer is desirably provided within an ASIC (Application Specific Integrated Circuit) that processes the image data. However, when the buffer is provided within the ASIC, there is a limit to increasing the capacity of the buffer. In addition, increasing the capacity of the buffer inevitably increases the cost.

Hence, according to the above described image forming apparatus employing the proposed method, an amount of the sub scan magnification correctable by the LED array becomes limited when the buffer does not have a sufficiently large capacity. When the amount of the sub scan magnification correctable by the LED array is limited and a satisfactory correction is impossible, the deterioration in the image quality of the image finally formed on paper or the like may not be sufficiently suppressed.

SUMMARY OF THE INVENTION

Accordingly, it is a general object in one embodiment of the present invention to provide a novel and useful optical scanner, image forming apparatus, and buffer control method for optical scanner, in which the problem described above may be suppressed.

Another and more specific object in one embodiment of the present invention is to provide an optical scanner, an image forming apparatus, and a buffer control method for the optical scanner, that may provide a sufficiently large capacity for the buffer without considerably increasing the cost, in order to positively correct a sub scan magnification by a LED array.

According to one aspect of the present invention, an optical scanner may include a LED (Light Emitting Diode) array in which a plurality of LEDs are arranged; an image correcting unit, including a memory to store image data, and configured to perform an image correction on the image data; an emission control unit, including an input buffer to receive the image data subjected to the image correction and an output buffer to output image data to cause light emission from the LED array, and configured to control the light emission of the LED array; and a buffer control unit configured to monitor vacant regions of the memory of the image correcting unit and the input buffer of the emission control unit, and transfer the image data from the memory of the image correcting unit to the input buffer of the emission control unit, wherein, when the emission control unit varies a period at which the image data is output from the output buffer in order to correct a sub scan magnification of the LED array and the vacant region of the input buffer ceases to exist, the buffer control unit temporarily stores the image data in the vacant region of the memory of the image correcting unit, and transfers the image data temporarily stored in the memory to the input buffer when the vacant region is generated in the input buffer.

According to another aspect of the present invention, an image forming apparatus may include an image bearing member; the optical scanner described above and configured to expose the image bearing member; a developing unit configured to form a toner image on the exposed image bearing member; and a transfer unit to transfer the toner image onto a recording medium.

According to still another aspect of the present invention, a buffer control method to control storage and transfer of image data in an optical scanner may include inputting image data subjected to an image correction by an image correcting unit of the optical scanner to an input buffer of an emission control unit of the optical scanner; outputting the image data stored in the input buffer from an output buffer of the emission control unit to control and cause light emission from the LED array; monitoring vacant regions of the memory and the input buffer by a buffer control unit of the optical scanner, and transferring the image data from the memory to the input buffer; and when the emission control unit varies a period at which the image data is output from the output buffer in order to correct a sub scan magnification of the LED array and the vacant region of the input buffer ceases to exist, temporarily storing the image data in the vacant region of the memory, and transferring the image data temporarily stored in the memory to the input buffer when the vacant region is generated in the input buffer, under control of the buffer control unit.

Other objects and further features of the present invention will be apparent from the following detailed description when read in conjunction with the accompanying drawings.

BRIEF DESCRIPTION OF THE DRAWINGS

FIGS. 7A through 7D are diagrams for explaining an example of the image data transfer process of the buffer control unit in the embodiment of the present invention.

DESCRIPTION OF THE PREFERRED EMBODIMENTS

Figure 1:
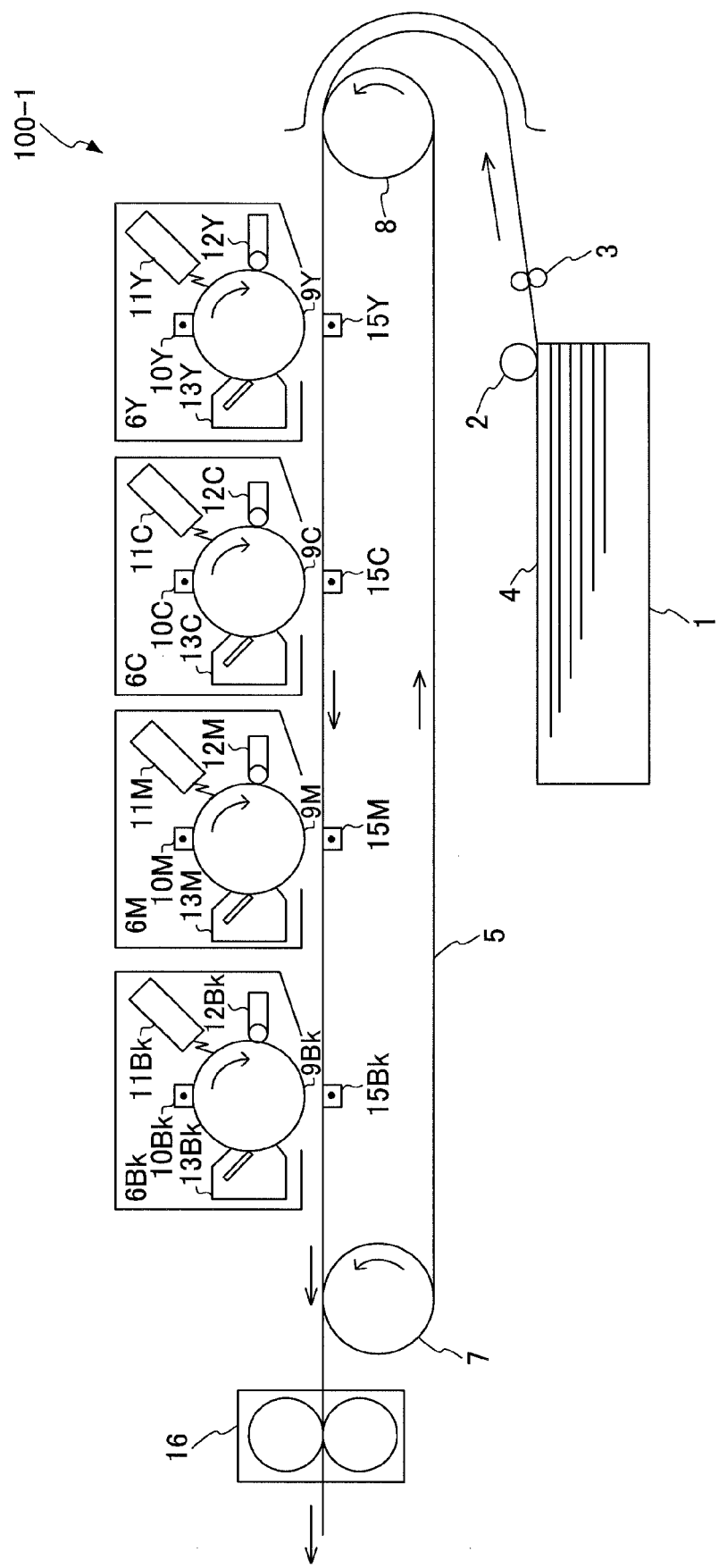
FIG. 1 is a diagram illustrating an example of an image forming apparatus in an embodiment of the present invention.

A description will be given of embodiments of the optical scanner, the image forming apparatus, and the buffer control method for the optical scanner, by referring to the drawings.

FIG. 1 is a diagram illustrating an example of an image forming apparatus in an embodiment of the present invention. An image forming apparatus 100-1 in this embodiment is the so-called tandem type, including a plurality of image forming units 6Y, 6C, 6M and 6Bk configured to form yellow, cyan, magenta and black toner images, respectively. The image forming units 6Y, 6C, 6M and 6Bk are arranged along a transport belt 5 from an upstream side towards a downstream side along a transport direction of the transport belt 5. A recording medium (hereinafter referred to as "paper" for the sake of convenience) 4 in a stack accommodated within a paper supply tray 1 is separated and supplied onto the transport belt 5 by a separating roller 3 and a paper supply roller 2, and transported in the transport direction indicated by arrows illustrated in FIG. 1. The transport belt 5 is an example of an endless transport part or means to transport the paper 4 in the transport direction.

The image forming units 6Y, 6C, 6M and 6Bk form toner images of different colors, however, have the same internal structure. Hence, the internal structure of only the image forming unit 6Bk is described in the following, and a description of the internal structures of the image forming units 6Y, 6C and 6M will be omitted. Corresponding parts of the image forming units 6Y, 6C, 6M and 6Bk are designated by the same reference numerals with corresponding affixes Y, C, M and Bk.

The transport belt 5 is provided around a driving roller 7 and a following roller 8. The driving roller 7 is rotationally driven by a driving part (not illustrated) such as a motor. The driving roller 7 and the following roller 8 form a driving part or means to drive the transport belt 5.

When the image forming apparatus 100-1 performs an image forming process, the paper 4 is successively supplied, one by one, from the stack accommodated within the paper supply tray 1, and is transported in a state in which the paper 4 is adhered on the transport belt 5 by electrostatic suction. When the paper 4 reaches a position opposing the image forming unit 6Y, a yellow toner image is formed on the paper 4. The paper 4 thereafter passes positions opposing the image forming units 6C, 6M and 6Bk where cyan, magenta and black toner images are successively formed in an overlapping manner on the yellow toner image that is formed on the paper 4, to thereby form a full-color toner image on the paper 4.

The image forming unit 6Bk includes a photoconductive drum 9Bk that is an example of an image bearing member. In addition, a charging unit 10Bk, a LED array 11Bk, a developing unit 12Bk, a drum cleaner 13Bk, and a charge eliminator (not illustrated) are arranged around the photoconductive drum 9Bk.

When performing the image forming process, an outer peripheral surface of the photoconductive drum 9Bk is uniformly charged by a charging unit 10Bk, and the LED array 11Bk exposes the charged surface of the photoconductive drum 9Bk in a shape corresponding to a black image in order to form the electrostatic latent image.

Next, the developing unit 12Bk adheres black toner on the electrostatic latent image that is formed on the surface of the photoconductive drum 9Bk, in order to transform the electrostatic latent image into a black toner image that is visible. Further, the photoconductive drum 9Bk is driven and rotated, and the transfer unit 15Bk transfers the black toner image on the photoconductive drum 9Bk onto the paper 4 transported by the transport belt 5 at a transfer position where the transfer unit 15Bk makes contact with the paper 4.

The surface of the photoconductive drum 9Bk after the black toner image is transferred onto the paper 4 is cleaned by the drum cleaner 13Bk that removes residual black toner not transferred and remaining on the surface of the photoconductive drum 9Bk. The photoconductive drum 9Bk is in a standby state ready to perform the next image forming process after being cleaned by the drum cleaner 13Bk.

The full-color toner image formed on the paper 4 after passing the positions opposing the image forming units 6Y, 6C, 6M and 6Bk is fixed on the paper 4 by heat and pressure applied by the fixing unit 16. The paper 4 bearing the fixed full-color image is ejected outside the image forming apparatus 100-1.

When forming the full-color image, the paper 4 on the transport belt 5 makes contact with each of the image forming units 6Y, 6C, 6M and 6Bk. On the other hand, when forming a monochrome image, the paper 4 on the transport belt 5 makes contact with only the image forming unit 8Bk. In this case, a separating mechanism (not illustrated) may be provided with respect to the image forming units 6Y, 6C and 6M in order to separate the image forming units 6Y, 6C and 6M from the transport belt 5 when forming the monochrome image. As a result, the separating mechanism may prevent a wear of photoconductive drums 9Y, 9C and 6M and the transport belt 5 when forming the monochrome image.

Figure 2:
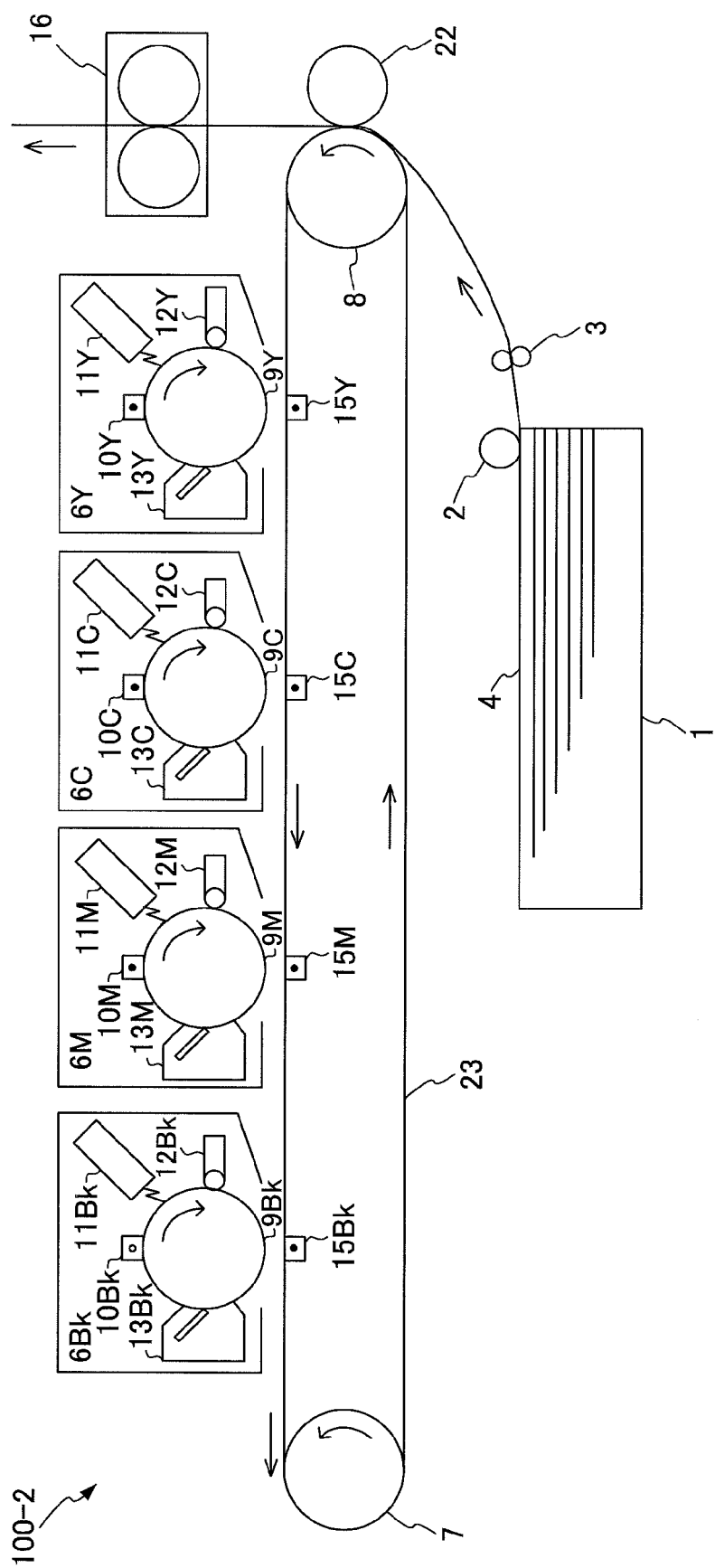
FIG. 2 is a diagram illustrating another example of the image forming apparatus in the embodiment of the present invention.

FIG. 2 is a diagram illustrating another example of the image forming apparatus in the embodiment of the present invention. In FIG. 2, those parts that are the same as those corresponding parts in FIG. 1 are designated by the same reference numerals, and a description thereof will be omitted.

An image forming apparatus 100-2 illustrated in FIG. 2 includes an intermediate transfer belt 23 in place of the transport belt 5. The intermediate transfer belt 23 is provided around the driving roller 7 and the following roller 8. The driving roller 7 is rotationally driven by a driving part (not illustrated) such as a motor. The intermediate transfer belt 23 is an example of an endless transfer part or means to transfer a toner image formed thereon onto the paper 4.

When performing an image forming process to form the full-color image, the yellow, cyan, magenta and black toner images are successively transferred onto the intermediate transfer belt 23 by a first transfer. The full-color toner image on the intermediate transfer belt 23 is transferred onto the paper 4 supplied from the paper supply tray 1 between the intermediate transfer belt 23 and a secondary transfer roller 22. The intermediate transfer belt 23 is sandwiched between the following roller 8 and the secondary transfer roller 22. Hence, the full-color toner image on the intermediate transfer belt 23 is transferred onto the paper 4 by a second transfer as the intermediate transfer belt 23 and the paper 4 pass between the following roller 8 and the secondary transfer roller 22. The following roller 8 and the secondary transfer roller 22 form a secondary transfer part that performs the second transfer.

The full-color toner image formed on the paper 4 after passing the secondary transfer part is fixed on the paper 4 by the heat and pressure applied by the fixing unit 16. The paper 4 bearing the fixed full-color image is ejected outside the image forming apparatus 100-2.

Therefore, in this embodiment, the toner images formed on the photoconductive drums 9Y, 9C, 9M and 9Bk may be transferred directly onto the paper 4 that is transported by the transport belt 5 as illustrated in FIG. 1, or transferred onto the intermediate transfer belt 23 before being transferred onto the paper 4 as illustrated in FIG. 2.

Furthermore, although this embodiment is applied to the tandem type image forming apparatus, this embodiment may be applied to a so-called revolver type image forming apparatus, for example. According to the revolver type image forming apparatus, a plurality of developing units 12 and the like may be arranged around a single photoconductive drum 9.

Figure 3:
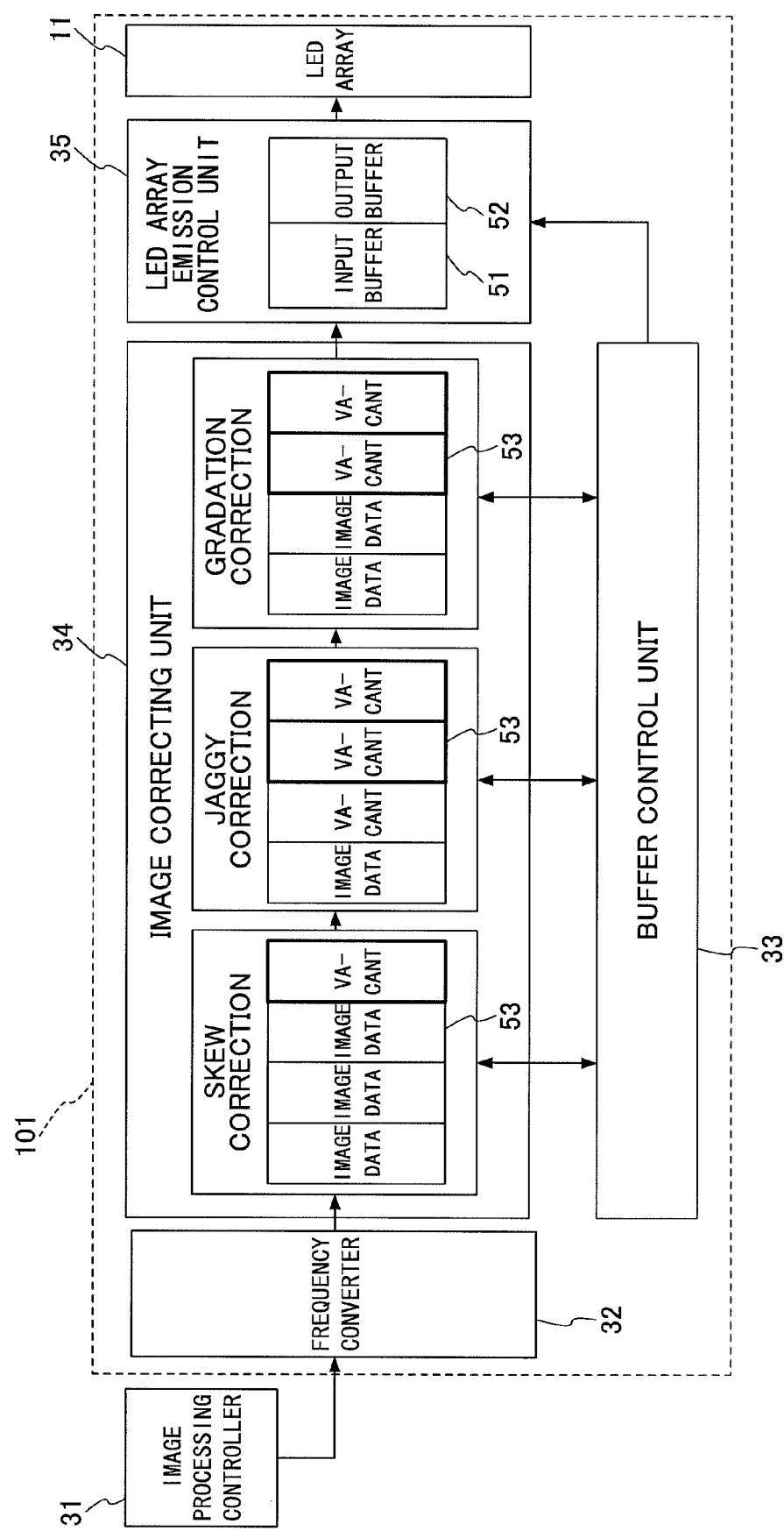
FIG. 3 is a block diagram illustrating an example of an optical scanner in the embodiment of the present invention.

FIG. 3 is a block diagram illustrating an example of an optical scanner in the embodiment of the present invention. An optical scanner 101 in this embodiment includes a frequency converter 32, a buffer control unit 33, an image correcting unit 34, a LED array emission control unit 35, and the LED array 11. The optical scanner 101 uses the LED array 11 to expose the charged surface of the photoconductive drum 9Bk, for example, depending on the image pattern, in order to perform an image formation that forms the electrostatic latent image on the surface of the photoconductive drum 9Bk.

When the LED array 11 is driven to perform the image formation, the image data is transferred from an image processing controller 31 to the frequency converter 32. The frequency converter 32 performs a frequency conversion process to convert a frequency of the image data into an operating frequency of the LED array 11.

The frequency converted image data from the frequency converter 32 is transferred to the image correcting unit 34 that performs various image corrections. For example, the image correcting unit 34 may include a plurality of image correcting modules for performing the image corrections, and each image correcting module may include a memory 53 that provides a work area for use by the image correction.

For example, the image corrections may include a skew correction, a jaggy correction, and a gradation correction. The skew correction corrects an oblique distortion in the image, and the jaggy correction smoothens an edge part of the image. In addition, the gradation correction shapes the image pattern depending on an image tone. A high-quality image may be output by performing such image corrections. Of course, additional image correcting modules may be provided in the image correcting unit 34 in order to perform image corrections other than the image corrections described above.

A SRAM (Static Random Access Memory), a nonvolatile memory, or the like may be used as the memory 53 of the image correcting module. The power consumption may be minimized and high-speed information input and output becomes possible when the SRAM is used as the memory 53. On the other hand, information may be retained even while the power is OFF when the nonvolatile memory is used as the memory 53, and thus, it may be unnecessary to perform the image adjustment and the like again the next time the power is turned ON.

An extremely high-speed operation is required for the image corrections. For this reason, the image correcting modules of the image correcting unit 34 may be provided within an ASIC in order to perform an image correcting process at the high speed.

Not all regions of the memory 53 of the image correcting module are used at all times. In other words, vacant or unused regions of the memory 53 exist depending on a print setting, transport state of the paper 4, and the like.

The LED array emission control unit 35 includes an input buffer 51 to receive the image data corrected by the image correcting process of the image correcting unit 34, and an output buffer 52 to output a signal based on the image data to the LED array 11. The LED array emission control unit 35 reads the signal from the output buffer 52, and supplies the read signal to the LED array 11 in order to cause light emission from the LED array 11.

The buffer control unit 33 may bypass the memory 53 of each of the image correcting modules of the image correcting unit 34 and the input buffer 51 of the LED array emission control unit 35, and monitor vacant regions of the memory 53 of each of the image correcting modules and the input buffer 51, respectively. When a vacant region does not exist in the input buffer 51 of the LED array emission control unit 35, the image data may be temporarily stored in the vacant region of the memory 53 of the image correcting module, and the image data temporarily stored in the memory 53 may be transferred to a vacant region of the input buffer 51 when the vacant region of the input buffer 51 is generated.

In the image forming apparatus 100-1 or 100-2, the peripheral velocity of the surface of the photoconductive drum 9 varies periodically when the eccentricity is generated in the photoconductive drum 9. In this case, a tone variation may occur in the sub scan direction (or transport direction) of the image that is finally formed on the paper 4 and output. This tone variation may be suppressed by correcting the light emission period of the LED array 11 that performs the exposure, so that the light emission period corresponds to a variation period of the peripheral velocity of the photoconductive drum 9. A sub scan magnification may be corrected by varying the light emission period of the LED array 11 in the manner described above.

Figure 4:
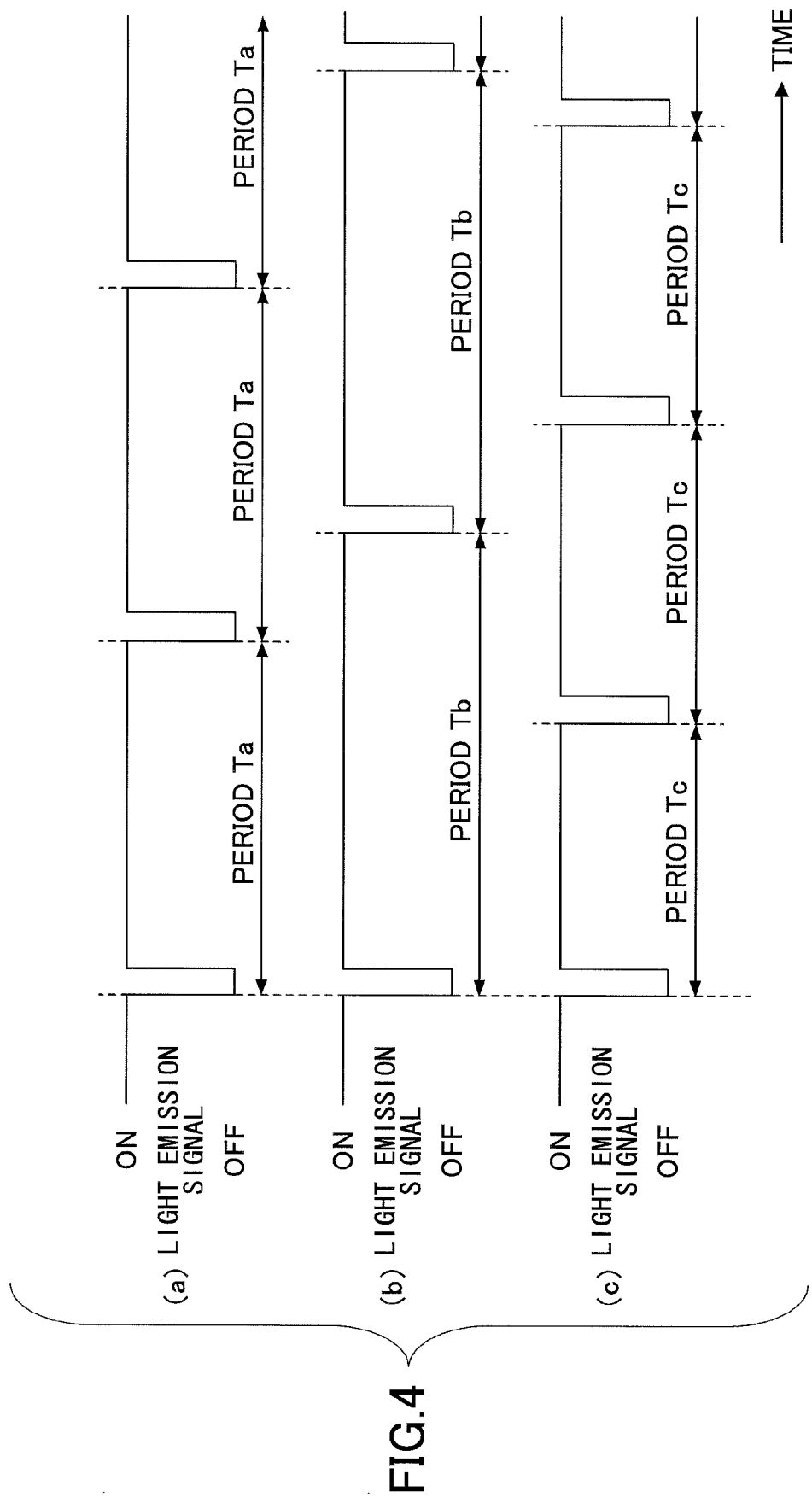
FIGS. 4(a) through 4(c) are diagrams for explaining a sub scan magnification correcting process of a LED array in the embodiment of the present invention.

FIGS. 4(a) through 4(c) are diagrams for explaining the sub scan magnification correcting process of the LED array in the embodiment of the present invention. The light emission of the LED array 11 is controlled by a light emission signal from the LED array emission control unit 35. Hence, the sub scan magnification of the LED array 11 may be corrected by modulating the light emission signal in the LED array emission control unit 35.

FIGS. 4(a) through 4(c) illustrate ON and OFF states of the light emission signal for a case in which no image correction is performed, a case in which the light emission period is increased, and a case in which the light emission period is decreased, respectively. The light emission periods for the cases illustrated in FIGS. 4(a), 4(b) and 4(c) are Ta, Tb, and Tc, respectively. By continuously changing the light emission of the LED array 11 while the photoconductive drum 9 makes one revolution, the sub scan magnification may be corrected, and an error generated in the line interval or pitch in the transport direction (or sub scan direction) of the electrostatic latent image that is formed on the surface of the photoconductive drum 9 may be eliminated.

A correcting amount of the correction of the sub scan magnification may be obtained by forming an image pattern at a constant interval or pitch on the photoconductive drum 9, detecting the interval or pitch of the image pattern by a sensor provided with respect to the photoconductive drum 9 or the transport belt 5 (or intermediate transfer belt 23), and calculating an amount of periodic change from the interval or pitch detected by the sensor.

Figure 5A:
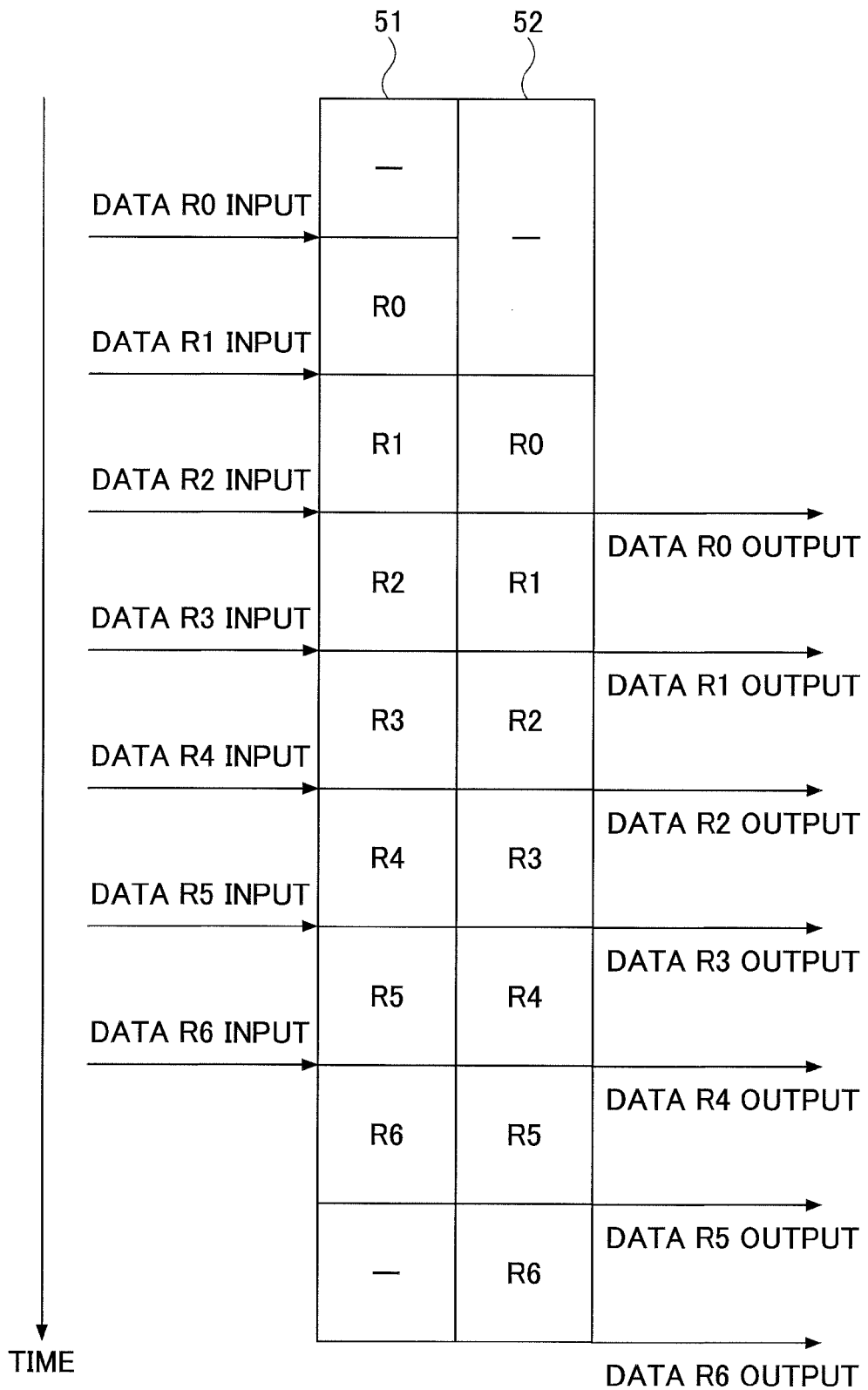
FIGS. 5A and 5B are diagrams for explaining an image data input and output process of a LED array emission control unit in the embodiment of the present invention.
Figure 5B:
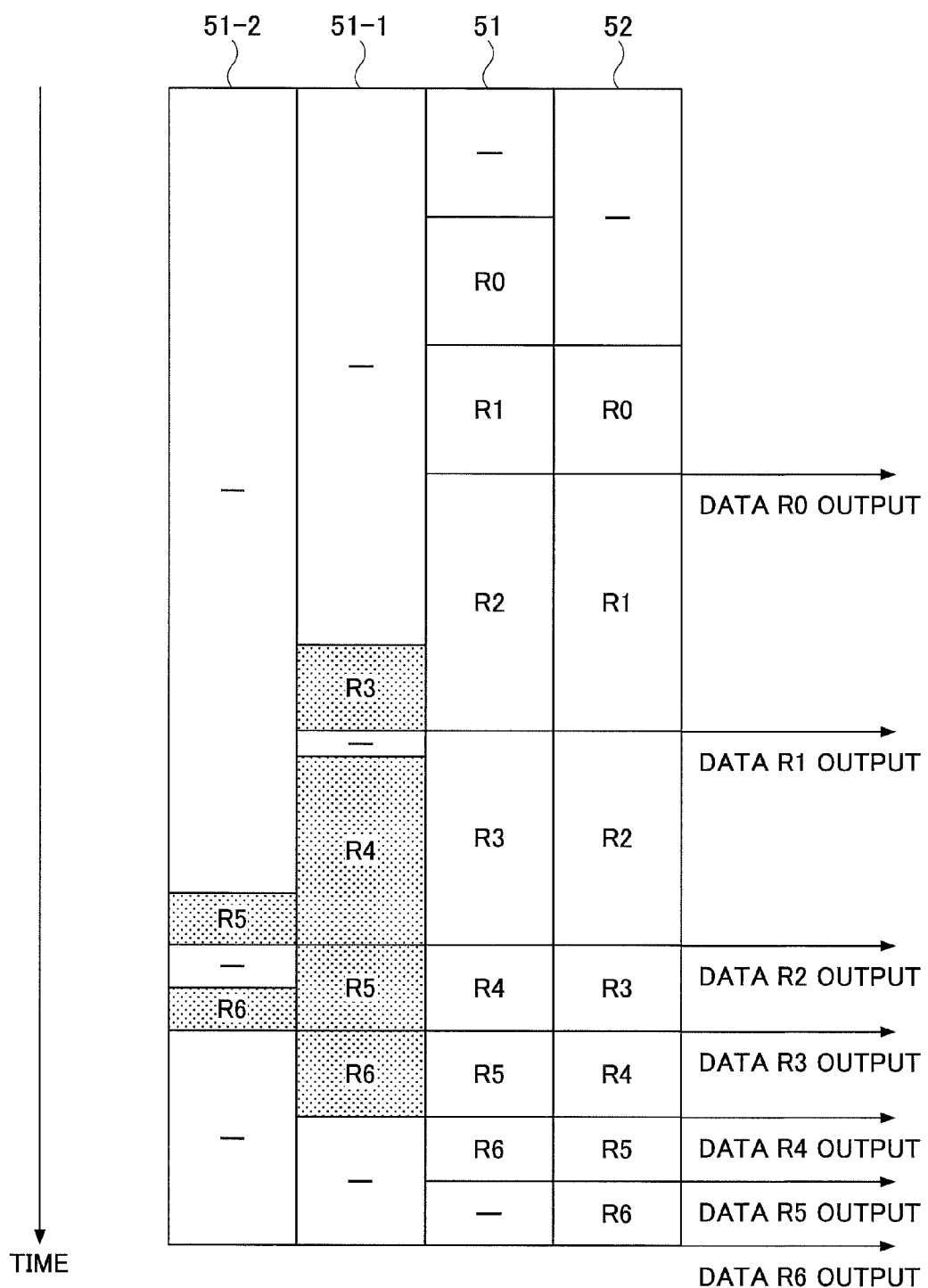

FIGS. 5A and 5B are diagrams for explaining an image data input and output process of the LED array emission control unit 35 in the embodiment of the present invention. FIG. 5A illustrates a case in which the sub scan magnification of the LED array 11 is not corrected, and FIG. 5B illustrates a case in which the sub scan magnification of the LED array 11 is corrected.

In the case illustrated in FIG. 5A in which the sub scan magnification of the LED array 11 is not corrected, the image data (R0 through R6) from the image correcting unit 34 are input to the input buffer 51 at a constant period, and output to the LED array 11 from the output buffer 52 at the same constant period as the input to the input buffer 51. For this reason, the amount of the image data to be input to the input buffer 51 does not exceed the capacity of the input buffer 51.

On the other hand, in the case illustrated in FIG. 5B in which the sub scan magnification is corrected, the image data (R0 through R6) from the image correcting unit 34 are input to the input buffer 51 at the constant period, however, the image data are output at a varied period to the LED array 11 from the output buffer 52. For example, the image data R1 and R2 are output at a period longer than the constant period, and the image data R5 and R6 are output at a period shorter than the constant period, in order to correct perform the sub scan magnification. As a result, the capacity of the input buffer 51 becomes temporarily insufficient, and the image data R3 through R6 may not be input to the input buffer 51.

When the capacity of the input buffer 51 is insufficient, buffers 51-1 and 51-2 illustrated in FIG. 5B become necessary in order to compensate for the insufficient capacity of the input buffer 51. In addition, when correcting the sub scan magnification by a large amount, the period at which the image data is output from the output buffer 52 needs to be greatly varied, which in turn requires an even larger buffer capacity.

However, the LED array control unit 35 is also provided within the single ASIC in which the image correcting modules of the image correcting unit 34 are provided. Consequently, there is a limit to the buffer capacity that may be provided, and a sufficiently large buffer capacity may not be provided. Further, the cost increases when the buffer capacity within the ASIC is increased.

Hence, the optical scanner 101 in this embodiment compensates for the insufficient buffer capacity of the input buffer 51 by the vacant region of the memory 53 in each of the image correcting modules, in order to correct the sub scan magnification of the LED array 11 without increasing the cost.

Figure 6:
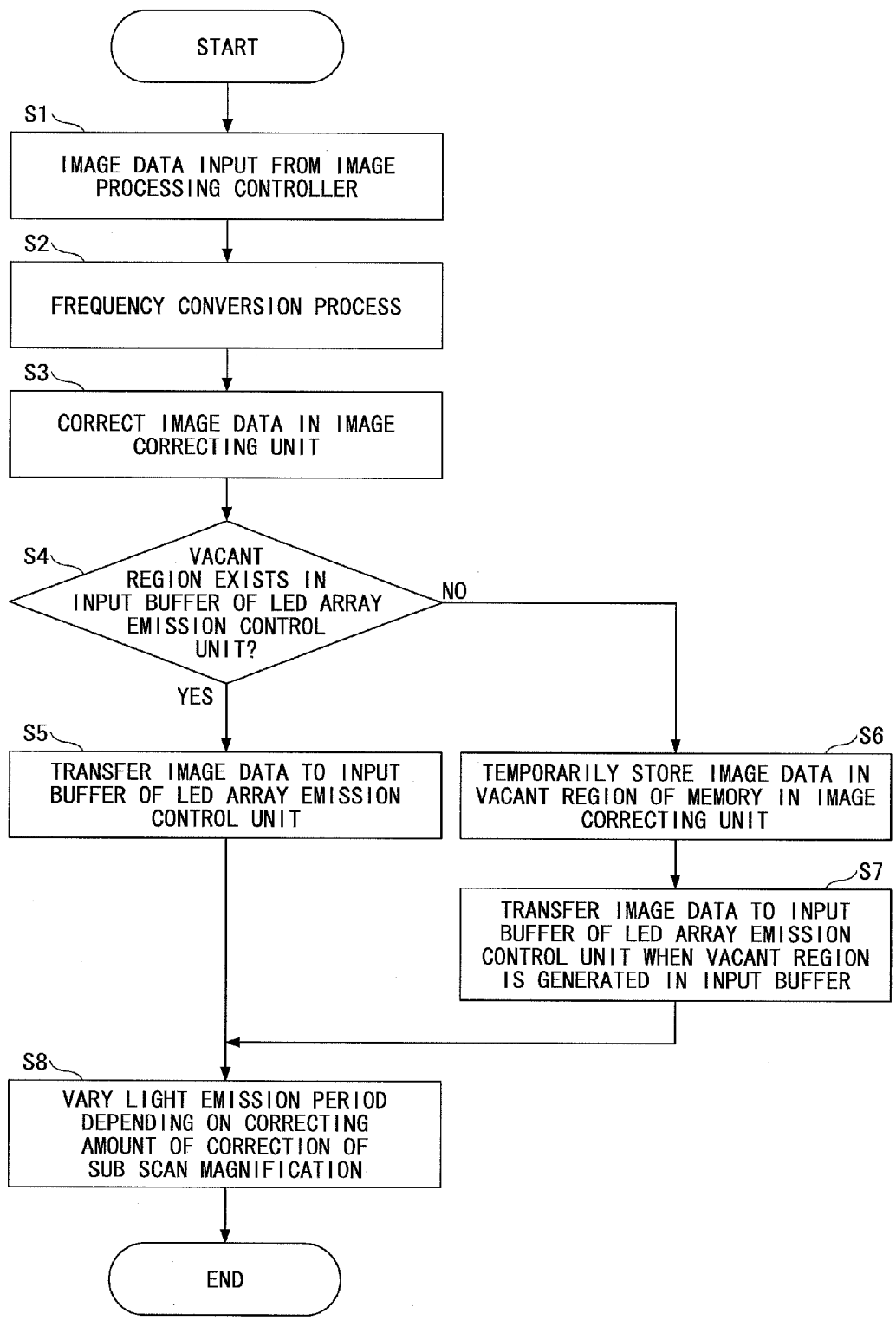
FIG. 6 is a flow chart for explaining an example of an image data transfer process of a buffer control unit in the embodiment of the present invention.

FIG. 6 is a flow chart for explaining an example of an image data transfer process of the buffer control unit 33 in the embodiment of the present invention.

First, in a step S1 illustrated in FIG. 6, the image data is input to the frequency converter 32 from the image processing controller 31. Then, in a step S2, the frequency converter 32 performs a frequency conversion process on the image data from the image processing controller 31. Next, in a step S3, the image correcting unit 34 performs an image correcting process with respect to the frequency-converted image data from the frequency converter 32. The image data subjected to the image correcting process is supplied to the LED array emission control unit 35 from the image correcting unit 34, in order to control the light emission of the LED array 11 based on the image data from the LED array emission control unit 35.

Before the image data is supplied to the LED array emission control unit 35 from the image correcting unit 34, the buffer control unit 33 decides (or confirms), in a step S4, whether the input buffer 51 of the LED array emission control unit 35 includes a vacant region.

When the decision result in the step S4 is YES, the image data from the image correcting unit 34 is transferred to the input buffer 51 of the LED array emission control unit 35 in a step S5. On the other hand, when the decision result in the step S4 is NO, the buffer control unit 33 temporarily stores the image data in the vacant region of the memory 53 within the image correcting unit 34 in a step S6. After the step S6, when it is confirmed in a step S7 that a vacant region is generated in the input buffer 51 of the LED array emission control unit 35, the buffer control unit 33 transfers the image data to the input buffer 51 of the LED array emission control unit 35 from the memory 53 of the image correcting unit 34.

After the image data is input to the input buffer 51 of the LED array emission control unit 35, the LED array emission control unit 35, in a step S8, controls the light emission of the LED array 11 at the signal period already subjected to the correction of the sub scan magnification, and the image data transfer process ends. In other words, the step S8 varies the light emission period depending on the correcting amount of the correction of the sub scan magnification.

Next, a description will be given of an example of the image data transfer process of the buffer control unit 33 in this embodiment, by referring to FIGS. 7A through 7D. FIGS. 7A through 7D are diagrams for explaining the example of the image data transfer process of the buffer control unit 33 in the embodiment of the present invention.

Figure 7A:
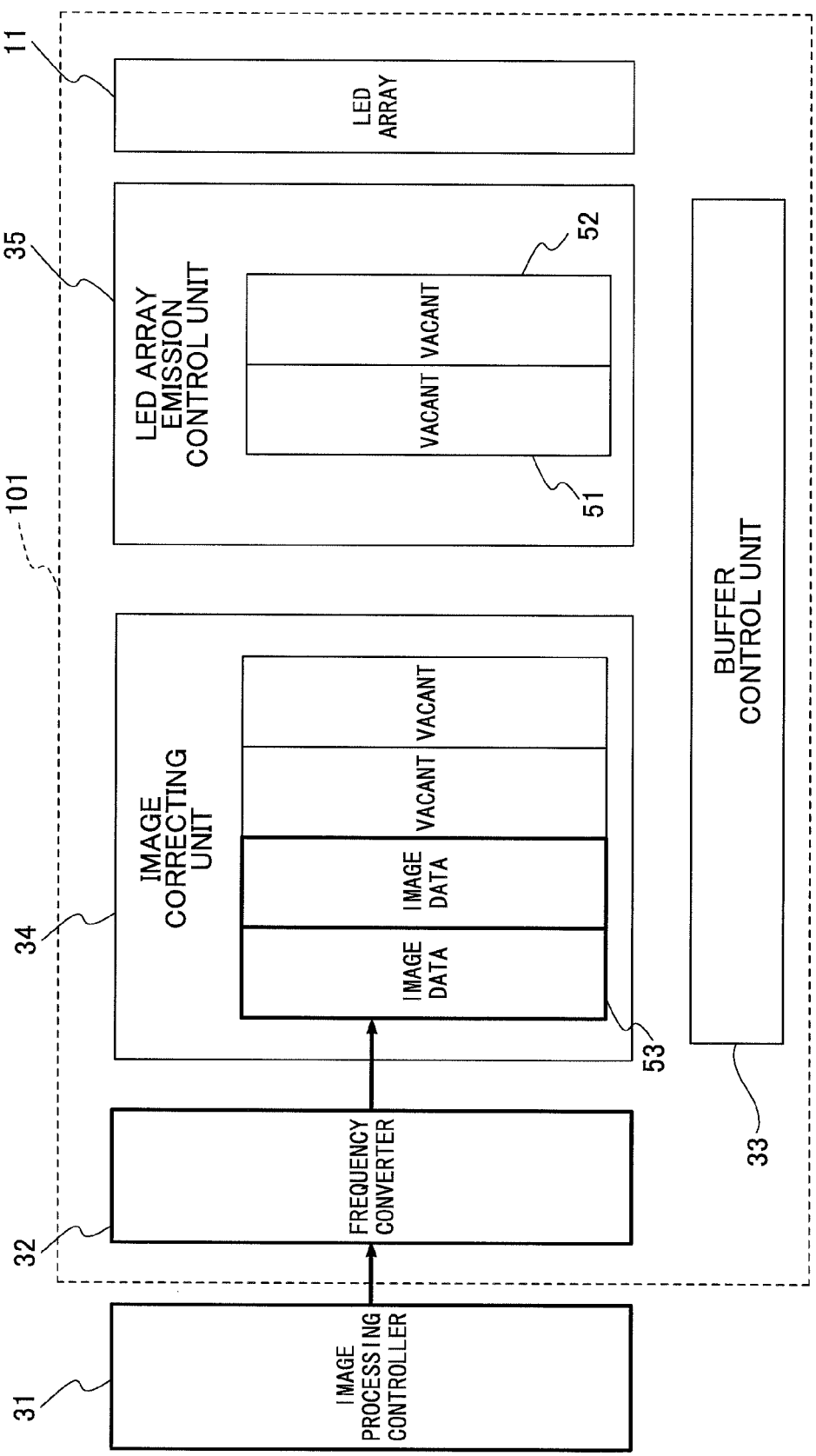

In FIG. 7A, the image data is input from the image processing controller 31, and after the frequency conversion process is performed in the frequency converter 32, the image correcting unit 34 performs the image correcting process, in a manner similar to the process described above in conjunction with the flow chart of FIG. 6.

Figure 7B:
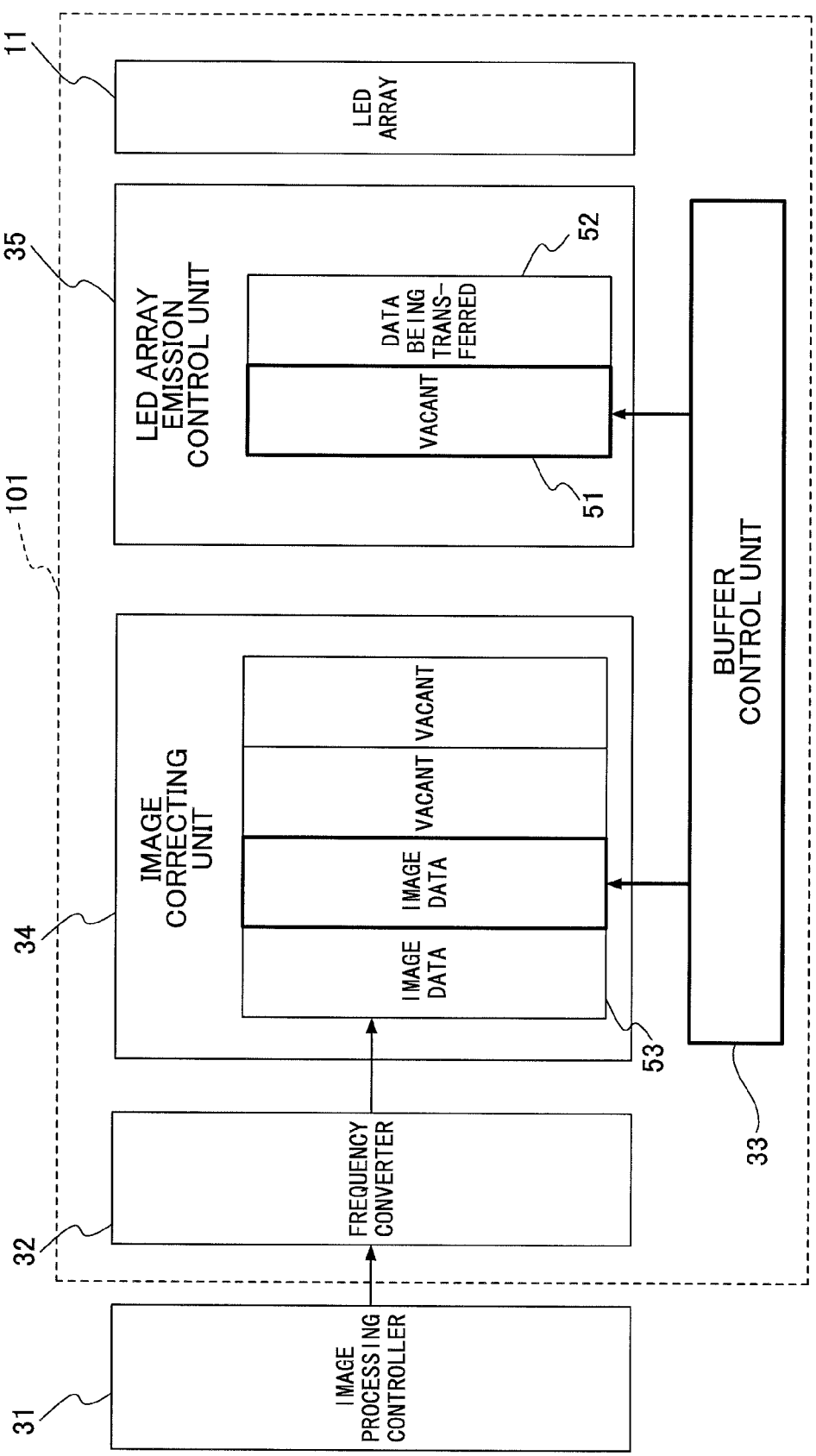

Next, in FIG. 7B, after the existence of the vacant region of the input buffer 51 is confirmed by the buffer control unit 33, the image data subjected to the image correcting process is input to the input buffer 51 of the LED array emission control unit 35.

In FIG. 7C, when transferring the image data from the image correcting unit 34 to the input buffer 51, the image data is temporarily stored in the vacant region of the memory 53 within the image correcting unit 34 if the buffer control unit 33 confirms that no vacant region exists in the input buffer 51 due to the existence of the image data in the input buffer 51 waiting to be transferred.

Thereafter, in FIG. 7D, when the buffer control unit 33 confirms that a vacant region is generated in the input buffer 51 of the LED array emission control unit 35, the image data waiting to be transferred and temporarily stored in the memory 53 of the image correcting unit 34 is transferred to the input buffer 51.

The buffer control unit 33 performs the process describe above when correcting the sub scan magnification of the LED array 11, in order to compensate for the insufficient capacity of the input buffer 51 of the LED array emission control unit 35 by the vacant region of the memory 53 within the image correcting unit 34. In addition, because the insufficient capacity of the input buffer 51 may be sufficiently compensated by the memory 53, the light emission period of the LED array 11 may be greatly varied, and the generation of inconvenient phenomena such as the tone variation in the output image may be effectively prevented.

Therefore, the buffer control unit 33 may monitor the vacant regions of the input buffer 51 of the LED array emission control unit 35 and the memory 53 of the image correcting unit 34, and temporarily store the image data in the vacant region of the memory 53 when the input buffer 51 does not have a vacant region. In addition, the image data temporarily stored in the memory 53 of the image correcting unit 34 may be transferred to the input buffer 51 of the LED array emission control unit 35 when a vacant region is generated in the input buffer 51.

By performing the above described process by the buffer control unit 33, the vacant region of the memory 53 within the image correcting unit 34 may be utilized effectively and efficiently. Moreover, the sub scan magnification of the LED array 11 may be corrected without increasing the buffer capacity of the LED array emission control unit 35, which would otherwise increase the cost.

In addition, because the sub scan magnification may be corrected by a sufficiently large amount, the generation of inconvenient phenomena such as the tone variation and a partial expansion or contraction of the image size, may be suppressed, in order to provide a high-quality image.

Further, the present invention is not limited to these embodiments, but various variations and modifications may be made without departing from the scope of the present invention.

What is claimed is:

1. An optical scanner comprising:
   an LED (Light Emitting Diode) array in which a plurality of LEDs are arranged;
   an image correcting unit, including a memory to store image data, and configured to perform an image correction on the image data;
   an emission control unit, including an input buffer to receive the image data subjected to the image correction and an output buffer to output image data to cause light emission from the LED array, and configured to control the light emission of the LED array; and
   a buffer control unit configured to monitor vacant regions of the memory of the image correcting unit and the input buffer of the emission control unit, and transfer the image data from the memory of the image correcting unit to the input buffer of the emission control unit,
   wherein, when the emission control unit varies a period at which the image data is output from the output buffer in order to correct a sub scan magnification of the LED array and a vacant region of the input buffer ceases to exist, the buffer control unit temporarily stores the image data in a vacant region of the memory of the image correcting unit, and transfers the image data temporarily stored in the memory to the input buffer when the vacant region is generated in the input buffer.

2. The optical scanner as claimed in claim 1, wherein the image correcting unit performs a skew correction to correct an oblique distortion in an image.

3. The optical scanner as claimed in claim 1, wherein the image correcting unit performs a jaggy correction to smoothen an edge part of an image.

4. The optical scanner as claimed in claim 1, further comprising:
   a frequency converter configured to convert a frequency of the image data to an operating frequency of the LED array.

5. An image forming apparatus comprising:
   an image bearing member;
   an optical scanner configured to expose the image bearing member;
   a developing unit configured to form a toner image on the exposed image bearing member; and
   a transfer unit to transfer the toner image onto a recording medium,
   wherein the optical scanner comprises:
   an LED (Light Emitting Diode) array in which a plurality of LEDs are arranged;
   an image correcting unit, including a memory to store image data, and configured to perform an image correction on the image data;
   an emission control unit, including an input buffer to receive the image data subjected to the image correction and an output buffer to output image data to cause light emission from the LED array, and configured to control the light emission of the LED array; and
   a buffer control unit configured to monitor vacant regions of the memory of the image correcting unit and the input buffer of the emission control unit, and transfer the image data from the memory of the image correcting unit to the input buffer of the emission control unit,
   wherein, when the emission control unit varies a period at which the image data is output from the output buffer in order to correct a sub scan magnification of the LED array and a vacant region of the input buffer ceases to exist, the buffer control unit temporarily stores the image data in a vacant region of the memory of the image correcting unit, and transfers the image data temporarily stored in the memory to the input buffer when the vacant region is generated in the input buffer.

6. The image forming apparatus as claimed in claim 5, wherein the image correcting unit performs a skew correction to correct an oblique distortion in an image.

7. The image forming apparatus as claimed in claim 5, wherein the image correcting unit performs a jaggy correction to smoothen an edge part of an image.

8. The image forming apparatus as claimed in claim 5, wherein the optical scanner further comprises:
    a frequency converter configured to convert a frequency of the image data to an operating frequency of the LED array.

9. The image forming apparatus as claimed in claim 5, further comprising:
    an intermediate transfer member configured to receive the toner image from the image bearing member,
    wherein the transfer unit transfers the toner image on the intermediate transfer member onto the recording medium.

10. The image forming apparatus as claimed in claim 5, further comprising:
    a transport part configured to transport the recording medium in the sub scan direction.

11. A buffer control method to control storage and transfer of image data in an optical scanner, comprising:
    inputting image data, that is stored in a memory of an image correcting unit of the optical scanner and subjected to an image correction, to an input buffer of an emission control unit of the optical scanner;
    outputting the image data stored in the input buffer from an output buffer of the emission control unit to control and cause light emission from an LED array;
    monitoring vacant regions of the memory of the image correcting unit and the input buffer by a buffer control unit of the optical scanner, and transferring the image data from the memory of the image correcting unit to the input buffer; and
    when the emission control unit varies a period at which the image data is output from the output buffer in order to correct a sub scan magnification of the LED array and the vacant region of the input buffer ceases to exist, temporarily storing the image data in the vacant region of the memory of the image correcting unit, and transferring the image data temporarily stored in the memory of the image correcting unit to the input buffer when the vacant region is generated in the input buffer, under control of the buffer control unit.

12. The buffer control method as claimed in claim 11, further comprising:
    converting a frequency of the image data to an operating frequency of the LED array by a frequency converter of the optical scanner.

* * * * *